United States Patent
Rothfus et al.

[11] Patent Number: 6,044,372
[45] Date of Patent: Mar. 28, 2000

[54] METHOD AND APPARATUS FOR PUBLISHING INFORMATION TO A COMMUNICATIONS NETWORK AND ENABLING SUBSCRIPTIONS TO SUCH INFORMATION

[75] Inventors: Eric J. Rothfus; Patrick J. Hill, both of Austin, Tex.

[73] Assignee: Dazel Corporation, Austin, Tex.

[21] Appl. No.: 08/896,783

[22] Filed: Jul. 18, 1997

[51] Int. Cl.[7] ................................................ G06F 15/173
[52] U.S. Cl. ....................... 707/10; 707/104; 395/200.31; 395/200.42; 395/200.43; 395/200.53
[58] Field of Search ................ 707/10, 104; 395/200.31, 395/200.42, 200.43, 200.53

[56] References Cited

U.S. PATENT DOCUMENTS

| | | | |
|---|---|---|---|
| 5,732,219 | 3/1998 | Blumer et al. | 395/200.57 |
| 5,737,599 | 4/1998 | Rowe et al. | 707/104 |
| 5,737,619 | 4/1998 | Judson | 707/500 |
| 5,742,762 | 4/1998 | Scholl et al. | 395/200.3 |
| 5,745,754 | 4/1998 | Lagarde et al. | 395/200.33 |
| 5,752,022 | 5/1998 | Chiu et al. | 707/10 |
| 5,761,673 | 6/1998 | Bookman et al. | 707/104 |
| 5,764,906 | 6/1998 | Edelstein et al. | 395/200.49 |
| 5,778,367 | 7/1998 | Wesinger et al. | 707/10 |
| 5,793,966 | 8/1998 | Amstein et al. | 395/200.33 |
| 5,796,952 | 8/1998 | Davis et al. | 395/200.54 |

*Primary Examiner*—Paul R. Lintz
*Assistant Examiner*—Jean R Homere
*Attorney, Agent, or Firm*—Russell D. Culbertson; Shaffer & Culbertson, LLP

[57] ABSTRACT

An information element to be published is first associated with a first network addressable location of a communications network. A repository arrangement programmed in a computer receives the information element to be published and stores the information element at a second network addressable location. The computer implementing the repository arrangement is connected to the communications network. When the information element is stored by the repository arrangement, a handle production arrangement programmed in the computer produces a repository handle for the information element. The repository handle includes identifying information relating to the information element to be published and information from which a network address for the second network addressable location may be produced. An information organizing arrangement programmed in the computer retrieves the repository handle for the information element to be published and stores the repository handle under a first network addressable location.

33 Claims, 9 Drawing Sheets

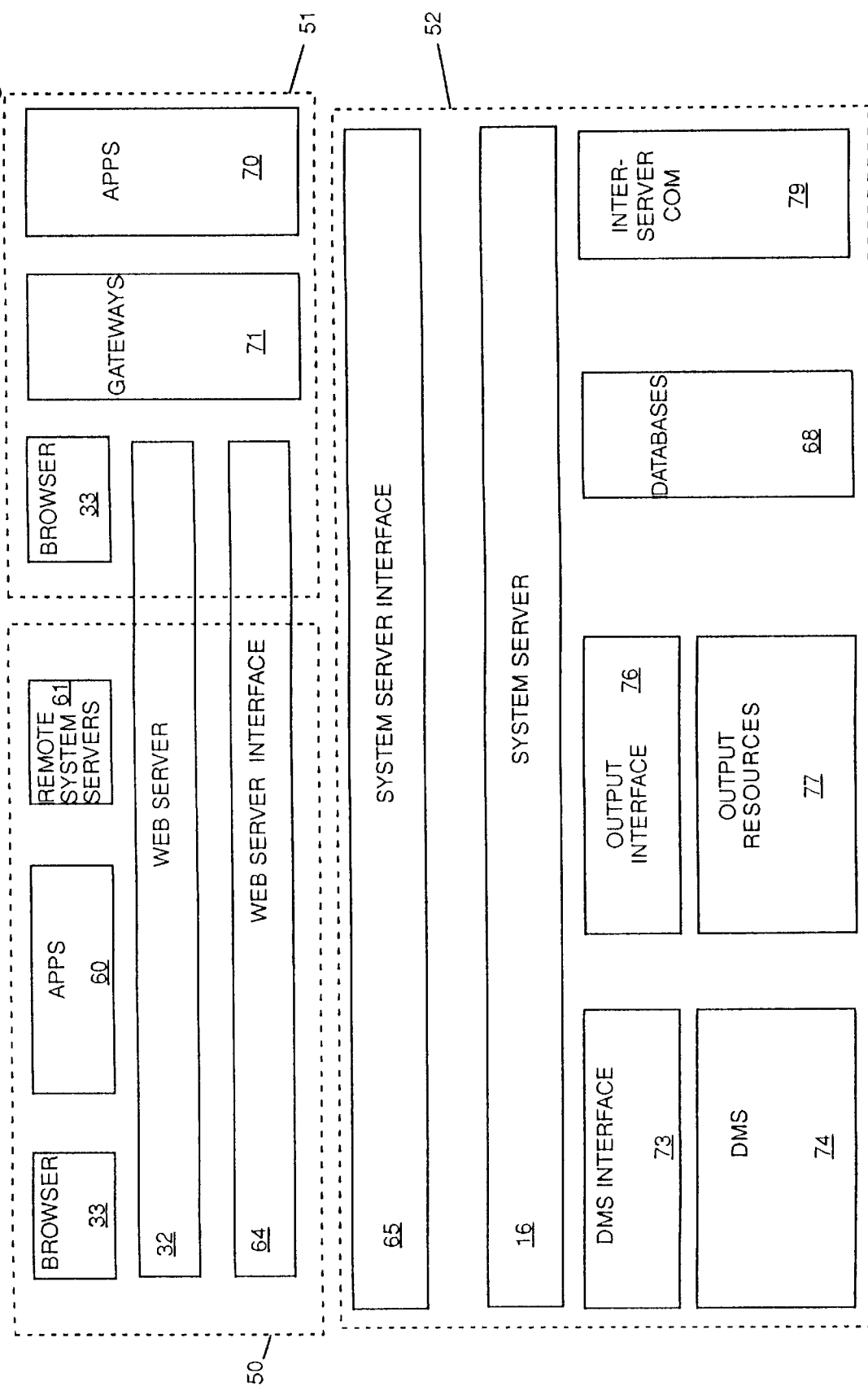

6,044,372

METHOD AND APPARATUS FOR PUBLISHING INFORMATION TO A COMMUNICATIONS NETWORK AND ENABLING SUBSCRIPTIONS TO SUCH INFORMATION

BACKGROUND OF THE INVENTION

This invention relates to communications networks and particularly the Internet. The invention includes an apparatus and method for publishing information to the Internet, and managing such publications to facilitate easy access by the intended recipients. The invention facilitates access to publications by enabling Internet users to subscribe to information which is published through the Internet.

The Internet comprises a network of computers interconnected by a separate communications network and using a common communications protocol. The common communications protocol and an arrangement for addressing resources or information stored or located on the network of computers provides what appears to Internet users to be seamless access to information published on the Internet virtually anywhere in the world. The interface to the Internet provided by the Worldwide Web has facilitated the development of easy-to-use browser applications which simplify Internet communications and has made the Internet available to anyone regardless of their technical knowledge.

The term "Internet" has come to be used to identify a particular network and the technology utilized by that network. However, unless otherwise noted, the term "Internet" is used in the remainder of this disclosure and the appended claims to describe the technology and networking topology employed by the particular network commonly referred to as the "Internet." Thus, the invention also has application to an "intranet", an instance of a local area network utilizing Internet technology, but which is not normally accessible by users other than those having access to the local area network.

The Internet and Worldwide Web (web) open up literally a world of information to anyone with a personal computer. Under the Worldwide Web interface, publishers or providers of information use a particular coding, Hypertext Mark-Up Language (HTML), for formatting information to be published to the web. The HTML based document or documents are stored in storage associated with an Internet or web server program operating on a computer having a constant connection to a communications system. These stored documents or files are accessible through a network wide addressing system using Universal Resource Locators (URLs) which identify a particular storage location or a particular related series of storage locations associated with a web server. URLs enable Internet users to download information which may be stored under any web server, regardless of where the web server is physically located.

Once information is published to an Internet location, it may be accessed by any Internet user having authorization to access the particular location. The user simply submits a URL, and the URL causes the identified web server, or host server to retrieve the information identified by the URL and transfer the information to the computer through which the URL was submitted. The information is transferred in a series of frames making up a web page which is displayed at the computer through which the URL was submitted. The information identifiable by a URL may actually comprise files stored at many different physical storage locations. The URL builds or defines an instruction to collect all of the related files and transfer the files to build a web page.

Commonly, users retrieve information using a graphical interface of a web browser program such as the NETSCAPE, NAVIGATOR and MICROSOFT EXPLORER web browser application programs. The HTML interface allows a document or web page identified under one Internet address or URL to include graphic links to other documents identified by other addresses. Once a first web page is loaded onto the user's computer, the user simply clicks on the graphic link to retrieve information stored at a URL address associated with the graphic link. Clicking on the graphic link causes the computer to submit the URL associated with the graphic link. This process of moving from one Internet published document or web page to the next using links embedded in the documents is commonly referred to as surfing the web.

The Internet and the Worldwide Web interface to the Internet has proven to be such a robust and convenient form of electronic communication that organizations have begun using the same technology for internal organization communications. A network utilizing Internet technology, but which is internal to an organization, such as a corporation or a governmental organization, is commonly referred to as an intranet.

Under Internet communications, published information must be located in some fashion by the user and then retrieved or down loaded to the user's location. The common method of locating Internet published information by surfing from one location to the next until a desired location is reached is time consuming and tedious. Although the Internet is highly successful at generally enabling information to be communicated, the system is very poor at organizing the information in a coherent fashion. The Internet includes no mechanism for alerting a user when important information is published or even simply facilitating access to information when it is published.

Another problem involves publishing information to the Internet through the Worldwide Web interface. Information which may need to be published may be created using a variety of software products including word processors, spread sheets, and graphics programs. In each case, the format of a particular document must be converted to a web viewable or readable format. That is, a format in which the document may be displayed at a user's terminal. Manually converting documents for Internet publication has heretofore been time consuming and has required specialized programs and knowledge.

The problems with the Internet do not end with the problems associated with publishing to the Internet and retrieving information from the Internet, that is, getting documents to the system, and then to the intended recipients. Internet communications pose significant information management difficulties. For example, prior to the present invention, Internet publishers had to maintain constant vigilance to ensure that publications are kept current and outdated publications are removed.

SUMMARY OF THE INVENTION

It is an object of the invention to provide a method and apparatus to overcome the above-described problems and other problems and deficiencies associated with Internet communications. More particularly, it is an object of the invention to provide a publish and subscribe system for publishing information to the Internet and enabling Internet users to subscribe to the published information, thereby improving access to the published information.

To accomplish these objects, the apparatus according to the invention includes a repository arrangement or means and an information organizing arrangement or means. Both the repository means and the information organizing means are implemented through software operating on a computer. The computer or computers implementing the repository means and information organizing means are each connected for Internet communications through a suitable web server.

The repository means receives information elements in the form of web viewable or readable files to be published through Internet technology. Each information element received by the repository means is associated with a first network addressable location, that is, a location identified by a network address such as a URL. The repository means operates to store the information element in storage under a second network addressable location identified by a network address. As used herein, a network addressable location is simply a location which may be identified by a network address such as a URL under which information may be stored and by which the stored information may be retrieved.

Handle production means associated with the repository means produces a repository handle for each information element received by the repository means. The repository handle includes identifying information relating to the information element such as a description of the content of the information element, and the network address identifying the second network addressable location. Once the handle production means produces the repository handle, it then transfers the repository handle to the information organizing means.

The information organizing means stores the repository handle under the first network addressable location with which the information element was associated when directed to the repository means. Storing each information element at one network addressable location and then an identifier for that network addressable location under a separate network addressable location allows information elements to be conveniently organized for monitoring and retrieval by interested Internet users.

Each first network addressable location includes a listing of the handle for each information element which was associated with the particular first location when the information element was published. The handles are presented in a web page which is viewable by an authorized user using any web browser running on a remote computer having Internet access. The content descriptive identifying information for each handle is displayed in the web page in some fashion along with a graphic link which will invoke the network address for the second network addressable location where the information element is stored. Each first network addressable location may also include a list of handles from another first network addressable location to which the user has subscribed as described below. In either case, the handles appear on the web page under one or more subject divisions. For example, a first network addressable location may be set up to include handles for company reports and include as different topics, sales reports, marketing reports, and product development reports. Each topic within a first network addressable location may be further separated or divided into subject categories. For example, the sales reports topic may include categories for different regions and the product development reports topic may include categories for different development projects.

According to the invention, the information organizing means allows an Internet user to set up a first network addressable location under one URL and then subscribe to information topics set up under a different first network addressable location under a different URL. Subscribing to a topic causes the handles of all information elements under the subscribed topic to be stored under the subscribing user's first network addressable location. Also, when a new information element is published and is associated with one first network addressable location under a subscribed topic, the information organizing means not only stores the repository handle for the published report under the associated first network addressable location, but also under each subscribing first network addressable location. To view the newly published report, the subscribing user does not have to know ahead of time that the report was published or the network address to which it was published. Rather, the subscribing user simply downloads their own first network addressable location and an identifier and link for the published report will appear there.

The invention also includes a publication arrangement or means associated with the organizing means. The publication means facilitates the publication of documents through various first network addressable locations. In the preferred form of the invention, the publication means includes processes allowing publication through non-Internet communications and through Internet communications. For publication through Internet communications, the publishing means includes programming for receiving a publish request, a file to be published representing an information element, and an association to a particular first network addressable location, all received from a remote computer through Internet communications. All of the information required for publication may be transmitted through any web browser adapted to transfer files. The publication means also preferably includes document conversion means for converting documents or files in non-web viewable formats to web viewable formats.

The preferred form of the invention further includes a reaction arrangement or means associated with the organizing means. The reaction means operates to produce a predefined action in response to the occurrence of an event which affects a first network addressable location. For example, a user may wish to receive an e-mail message or a page when a new quarterly sales report is published. The reaction means allows the user, from their web browser, to define the action, that is, the e-mail message or page they are to receive, and to define an event type and filter conditions which identify which report is to trigger the action. In this example, when the triggering report is published and a handle for it appears under the first network addressable location, that event satisfies the event type and filter conditions set by the user and causes the reaction means to request the predefined action, that is request the e-mail or page. The system is adapted to interface with a suitable process for performing each supported action.

The apparatus and method according to the invention facilitate the publication of information through an Internet technology network and allows others to view that information using any web browser. Publication through the repository handle listings under a first network addressable location combined with the subscription arrangement included in the preferred form of the invention allows users to locate topics and automatically obtain links to information elements under such topics. This is in contrast to prior Internet publishing where a user had to surf haphazardly from one location to the next to locate published information. Furthermore, the reaction means associated with the invention allows users to obtain notification when information is published under a particular topic, unlike prior Internet publishing which included no reliable means by which an interested user could obtain notification when useful information was available.

These and other objects, advantages, and features of the invention will be apparent from the following description of the preferred embodiments, considered along with the accompanying drawings.

BRIEF DESCRIPTION OF THE DRAWINGS

FIG. 3 is a block diagram illustrating the elements of a publish and subscribe system according to the invention.

DESCRIPTION OF THE PREFERRED EMBODIMENTS

Figure 1:
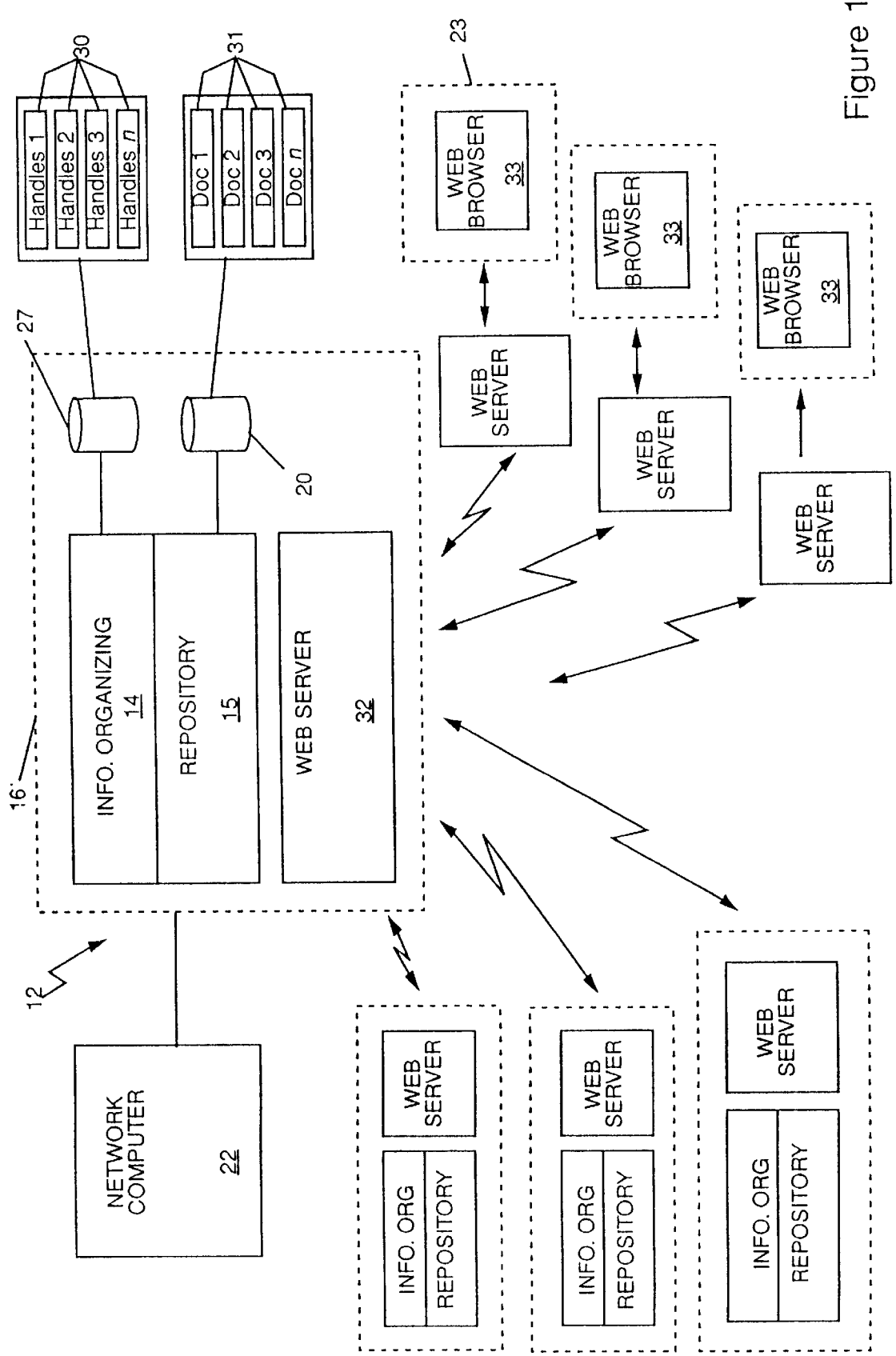
FIG. 1 is a diagrammatic representation of a network publish and subscribe system embodying the principles of the invention.

FIG. 1 illustrates the basic components and interactions of a network publish and subscribe system 12 embodying the principles of the invention. The system 12 is comprised of various software components or processes operating on a digital computer. The core components of the invention comprises an information organizing means 14 and a repository means 15 both programmed on computer or system server 16. Although the information organizing means 14 and repository means 15 are illustrated in FIG. 1 as operating on a single computer 16, those skilled in the art will readily appreciate that the processes may be operating within a suitable distributed computing environment in which the processes are actually being executed by more than one computer or processor. Throughout this disclosure, a process operating within a distributed computing environment should be considered equivalent to such a process operating on a single computer, such as computer 16.

Figure 1A:
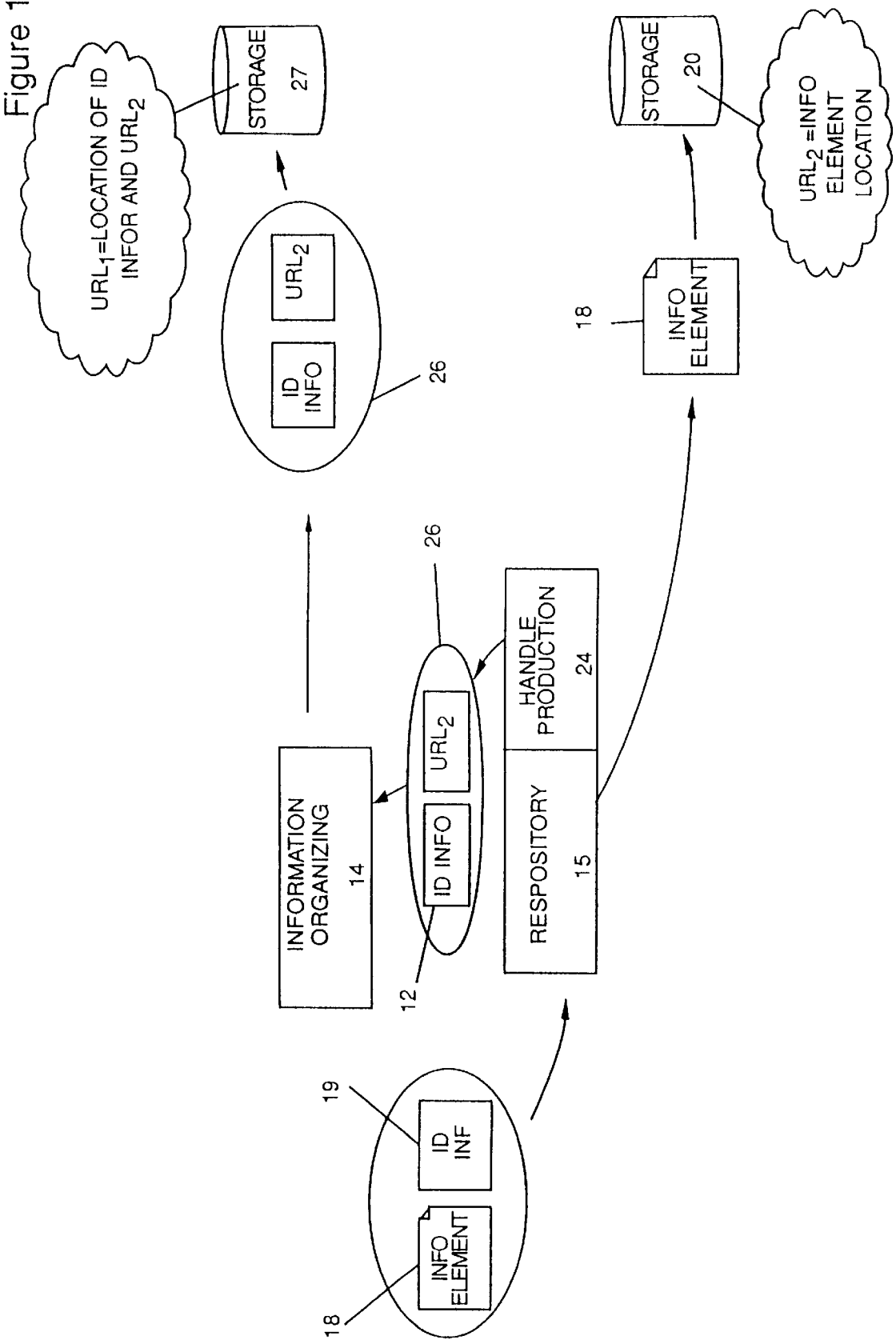
FIG. 1A is a diagrammatic representation of the transfer of information to the repository means and information organizing means according to the invention.

Referring to FIGS. 1 and 1A, the repository means 15 operates to receive an information element 18 to be published along with identifying information 19 for the information element, and then store the information element under a network addressable location identified in some fashion, such as by $URL_2$, for example. The information element 18 is preferably stored in a mass storage device 20 associated with computer 16.

The computer or system server 16 through which the repository means 15 is operating is connected for communications through a communications network and particularly, an Internet communications network. The term "network addressable location" as used in this disclosure and the appended claims means a location which is addressable or identifiable by an addressing arrangement employed by the particular communications network. Referring particularly to Internet technology, the addressing arrangement may comprise the URL system. Thus, the network addressable location refers to a "location" from which information including files or documents may be retrieved using a network address. It will be appreciated that the "location" is not necessarily a single, contiguous area of memory in mass storage. Rather, an information element 18 may be built from many separate files or documents filed in separate mass storage locations and recalled by a particular URL or other network address. In the Internet example, the URL serves as a command to retrieve the separate components of an information element 18 and assemble the components to create the information element.

The invention will be disclosed herein as implemented utilizing Internet communications technology. However, those skilled in the art will appreciate that the invention may be implemented using other communications technology which provides functionality similar to that provided by the Internet.

The repository means 15 receives the information element 18 and the identifying information 19 from a publication means or arrangement which will be described below. The information element 18 may originate from a network computer 22 communicating with the system server 16 by some means or from a remote computer 23 through Internet communications. When the information element 18 is received by the repository means 15, the information element has already been associated with another network addressable location, $URL_1$ in FIG. 1A for example, different from where the information element is stored by the repository means. This separate network addressable location (e.g., $URL_1$) associated with the information element 18 by the publisher will be referred to in this disclosure and the accompanying claims as a first network addressable location 30. The network addressable location (e.g., $URL_2$) at which the information element 18 is stored by the repository means 15 will be referred to as a second network addressable location 31.

The identifying information 19 received by the repository means 15 is also defined or produced through the publication means. The identifying information 19 preferably includes a title of the information element 18, a description of the information element, a creation time, and a source of the information element. Some information elements may relate to an event such as an appointment. In such cases, the identifying information 19 for the information element 18 may include start and end times for the event.

Upon receipt and storage of the information element 18 by the repository means 15, a handle production means or arrangement 24 associated with the repository means produces a repository handle 26 for the information element 18. The repository handle 26 includes the identifying information 19 and the network address (e.g., $URL_2$ or elements from which $URL_2$ may be developed when required) for the second network addressable location 31 within which the information element 18 has been stored. Thus, the repository handle 26 includes all information required to identify the information element 18 and to recall or retrieve the information element through the network addressing arrangement.

After the handle 26 is produced for an information element 18 being published, the handle the production means 24 transfers the repository handle to the information organizing means 14. The information organizing means 14 stores the repository handle 26 under the first network addressable location 30 (e.g., $URL_1$) with which the particular information element 18 was associated when published. As with the storage performed by the repository means 15, the information organizing means 14 preferably uses mass storage 27 associated with the computer 16 through which the organizing means is operating. Although shown as separate storage devices, those skilled in the art will readily appreciate that the mass storage devices 20 and 27 used by the repository means 15 and information organizing means 14 may be the same storage device.

The repository means 15 stores the actual information element 18 published to the system 12. The information element 18 may be a document such as a report or letter, or a file such as a database file, or any other type of information. Many different information elements 18 may be associated with a single first network addressable location 30 such as $URL_1$ in FIG. 1A. Thus, the handles 26 for the different information elements 18 are stored by the information organizing means 14 under the common first network addressable location. When the first network addressable location 30 (e.g. $URL_1$) is retrieved, the handle 26 for each associated information element 18 is also retrieved. Since each handle 26 includes all information necessary to describe and identify a particular associated information element 18 and to retrieve the information element itself, a user may use the information stored under the first network addressable location 30 to locate and retrieve information elements of interest.

The information organizing means 14 is capable of storing handles 26 under any number of different first network addressable locations 30. Each such network location represents a location through which related information elements or information elements of interest may be accessed. The address (e.g., $URL_1$) for retrieving handles 26 stored under one of the first network addressable locations also preferably retrieves information which produces a display in a particular format and including controls for performing various functions. These elements together, the handles 26 stored under a first network addressable location 30 and the display information retrieved along with the handles, build a primary display or interface comprising a web page of web viewable information. The primary display will be discussed in detail referring to FIGS. 2A and 2B.

As shown in FIG. 1, the publish and subscribe system 12 preferably includes a plurality of system servers 16 all interconnected using Internet technology. A web server process 32 is thus associated with each system server 16 and each remote computer 23. A user at a remote computer 23 may use the Internet communications protocol, to retrieve and view all handles 26 stored under any first network addressable location 30 stored under any system server 16. The user retrieves a particular first network addressable location 30 by submitting a network address (e.g. $URL_1$) for the desired first network addressable location.

The URL may be submitted conveniently through web browser 33. Using a web browser 33, the contents first network addressable location displays as a web page under the remote user's web browser application. The web page display lists the viewable portions of the handle 26 associated with each information element 18 associated with the particular first network addressable location 30 and also, includes the network address (e.g. $URL_2$ in FIG. 1A) for the second network addressable location 31 under which a particular information element 18 is stored. Preferably, the network address for the information element 18 is included under a graphic link on the display. From the web page for the first network addressable location 30, the user may view an information element 18 associated with a handle 26 displayed on the page by clicking on the graphic link. This action invokes the network address of the second network addressable location 31 (e.g. $URL_2$) causing the information element 18, to be retrieved to the user's remote computer 23 where it may be viewed if it is in a web viewable format.

FIG. 1 illustrates the preferred implementation of the invention in which the network communications technology comprises Internet technology. This communications technology allows any number of users to access information published through the first network addressable locations 30. Using the common addressing system provided by the URL system, the invention allows users to view locations 30 and information elements 18 which are stored anywhere on the system, that is, on any system server 16. This accessibility combined with the subscription and reaction processes described below allows the system 12 according to the invention to greatly increase accessibility to information.

Figure 2A:
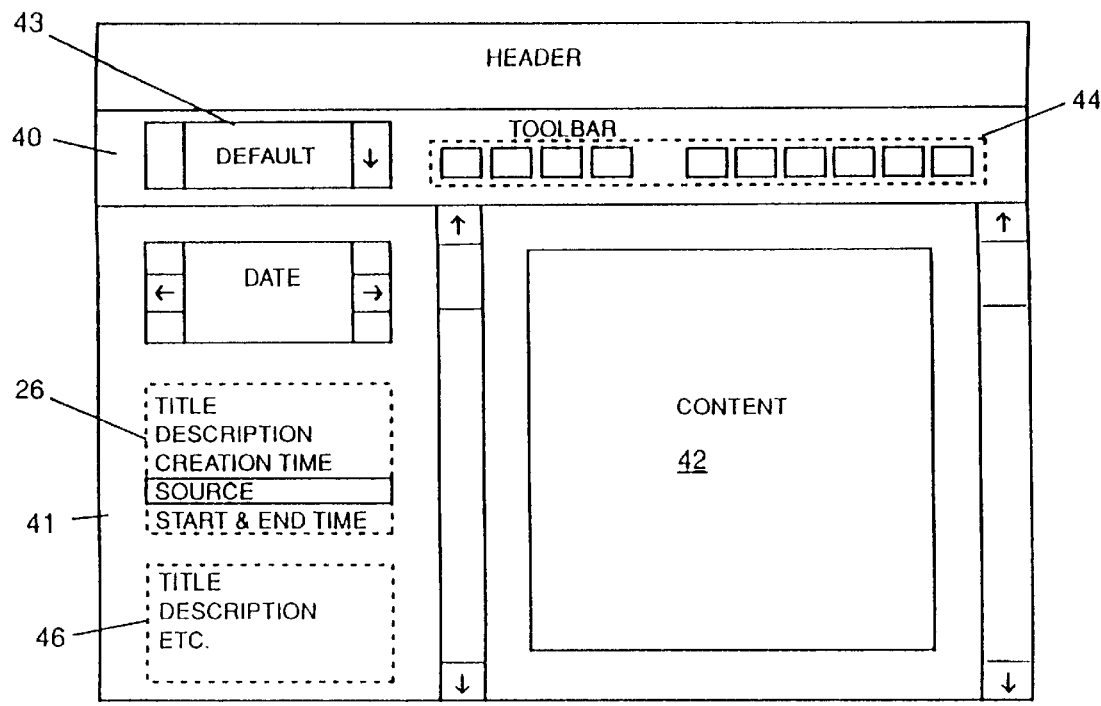
FIG. 2A is a representation of a primary display for a first network addressable location embodying the principles of the invention.
Figure 2B:
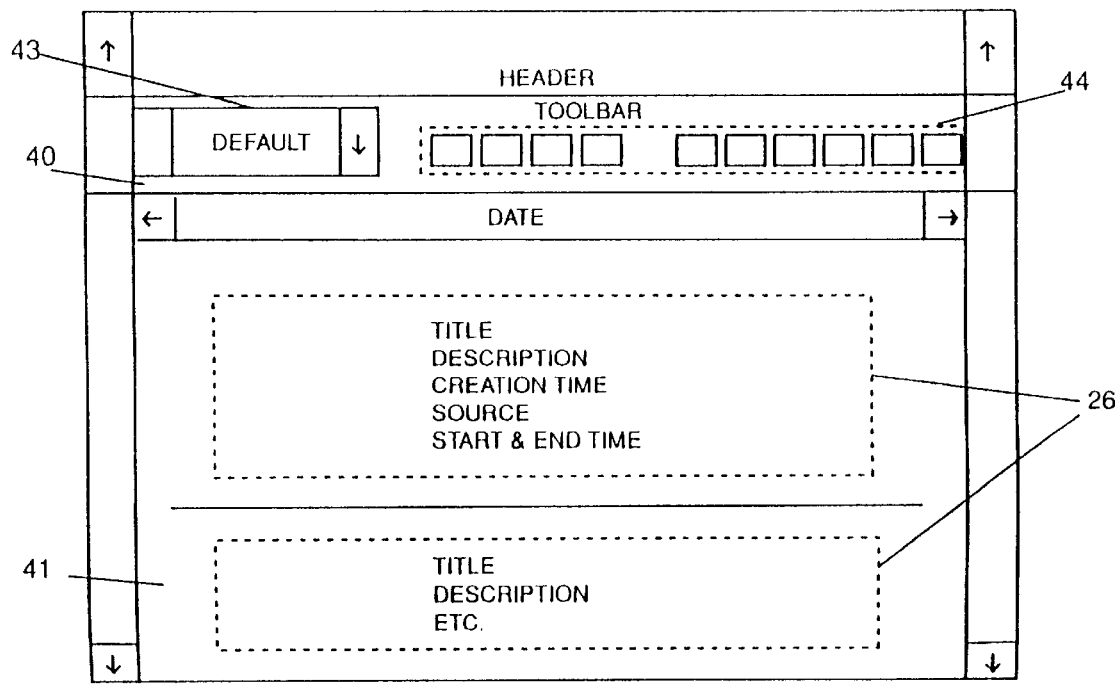
FIG. 2B is a representation of an alternative primary display for a first network addressable location.

FIGS. 2A and 2B illustrate two alternative primary displays or graphical user interfaces (GUIs) for a first network addressable location (30 in FIG. 1). A display may appear under any web browser through which the first network addressable location 30 may be retrieved. The primary display in FIG. 2A illustrates a framed display, while FIG. 2B illustrates an unframed display. Referring to FIG. 2A, the display includes a toolbar 40, an index 41, and a content area 42. Although not shown in the figures, the primary display may also include a header and a footer.

Referring still to FIG. 2A, the illustrated preferred toolbar 40 includes a topic selector 43 and a plurality of operation buttons 44. The topic selector 43 is used to select a topic division under which handles 26 may be grouped. The operation buttons 44 may include display options allowing the display to include, for example, all handles 26 or just those relating to a certain period of time, such as a particular day, week, or month. Other operation buttons 44 may facilitate publishing to the system, set-up operations such as first network addressable location, display, topic, subscription, and permission set-up, a search operation, a refresh operation, and a help operation.

Each handle 26 is displayed in the index 41. The current date may be displayed at the top of the index 41 portion of the display. Each handle 26 includes the identifying information portion of the handle, and preferably a graphic link which will invoke the address or URL for the second addressable location where the associated information element is stored. The graphic link may be the title portion of the handle 26 such that the action of clicking on the title invokes the URL for the information element associated with the particular handle. The index also includes a scrollbar provided by the browser application to allow the user to scroll down through the index to view the various handles 26 which are listed.

The handles 26 are grouped according to a particular subject division or topic. The primary subject divisions or topics may be broken down into further divisions or categories. Any of these subdivisions or categories may be defined so as to appear under more than one topic. The user sets up the topics and categories or other subject divisions included in the particular display. In the illustrated displays, the index includes handles under one topic at a time and topics are chosen through the topic selection button 43 and menu associated with the toolbar 40.

The display shown in FIG. 2A includes a content area 42 for displaying an information element retrieved from a second network addressable location. The content area 42 includes a scrollbar provided by the browser application to allow the user to scroll through long documents displayed to the content area 42.

The alternative display shown in FIG. 2B illustrates a non-framed display. This alternative display includes the toolbar 40 with topic selection device 43, index 41, and if desired, a header and footer (not shown), all similar to those elements shown in FIG. 2A. However, the non-framed display illustrated in FIG. 2B includes no content area. Handles 26 under a chosen topic are simply listed across the entire display. When a link within a handle is clicked to retrieve an information element, the information element appears over the entire display replacing the primary display. The user may return to the primary display by moving to the previous page function of the web browser.

The publish and subscribe system according to the invention includes a permissions system (not shown) which defines each user's permission to perform particular system operations. The permissions granted to various users are preferably stored in a data table maintained by the system server 16. For each requested operation, the system server 16 queries the permissions data table to determine whether the particular user has permission to perform the requested operation. In the preferred form of the invention, the user supplies a user name and password in order to retrieve a particular first network addressable location, and then permissions for further operations are analyzed for that user name and password.

FIG. 3 illustrates the architecture of the preferred implementation of the invention. The system architecture may be separated into the subscribe components 50, publish components 51, and system components 52. The subscribe components 50 enable a user to subscribe to information elements which may be published through the system. The publish components 51 enable a user to publish an information element to the system.

Subscribing according to the invention involves a process in which a user incorporates a subject division (topic) or even a handle (26 in FIGS. 1 and 1A) from one first network addressable location (30 in FIG. 1) into another. When a user subscribes to a topic of first network addressable location X, for example, that topic and all handles under the topic are incorporated into the subscriber's first network addressable location. That is, all handles under the subscribed topic under first network addressable location X are referenced under first network addressable location representing the subscriber's first network addressable location. Furthermore, any future information element which is associated with first network addressable location X when published, will in addition to having the associated handle stored in the first network addressable location X, will also have the handle stored under the subscriber's first network addressable location. Thus, a subscribing user need only view the web page display for their own first network addressable location, to obtain links to other information of interest which has been published. The subscribing user obtains these links automatically without needing to have any knowledge of the publication.

A user may subscribe to information elements published to the system through the user's web browser 33 using the primary display, potentially through other applications 60 supported by the system, and by remote system servers 61. In each case, the particular component, browser 33, application 60, or remote system server 61 submits a subscribe request to subscription means associated with the organizing means 14 (FIG. 1) operating on the system server 16. The subscription request is submitted through the web server 32 and a web server interface 64. The web server 32 passes the request from the submitter using Internet communications protocol. The web server interface 64 receives the request under the Internet protocol and transforms the request to a system request form, that is, a form acceptable to the system server 16. The transformed request is then submitted to a system server interface 65 to invoke commands or functions to be performed by subscription means programmed in the system server 16. The commands or functions invoked by the subscription request include a search for permission to subscribe as requested, the addition of information to a subscription table maintained in a database 68 by the system server 16, and referencing of the subscribed topic to the subscriber's first network addressable location. This subscription process is discussed with reference to FIGS. 7A, 7B and 8 below.

The illustrated architecture shows three avenues for publishing an information element (18 in FIG. 1) to the system under the publish components 51. The first avenue is through Internet communications technology. Under this publication avenue, the user submits a publish request through their browser 33 using a display such as the primary display shown in FIGS. 2A and 2B. The publish request is transmitted in the network protocol through the web server 32. The web server interface 64 transforms the publish request from the network protocol to a system form. The request in system form is then submitted to the system server interface 65 which invokes the commands or functions which are to be performed by publication means programmed in the system server 16. The commands for publication include obtaining the identified document or other information element to be published, storing the information element and the handles to the information element, and searching for reactions to be performed. The publication means and process is discussed in detail with reference to FIGS. 5 and 6.

The two other avenues for publication require non-Internet based communications to the system server 16. The system according to the invention may be adapted to communicate with various applications 70 or through resource gateways 71 for resources such as facsimile machines, and scanners, for example, to receive information elements to be published. An example of an application 70 which may be used to submit documents to be published and publication requests comprises the delivery system disclosed in U.S. patent application Ser. No. 08/330,390, entitled APPARATUS AND PROCESS FOR DISTRIBUTING INFORMATION USING AN ELECTRONIC PACKAGE REPRESENTATION, now U.S. Pat. No. 5,870,089, which is incorporated herein by reference. Publication through an application 70 or gateway 71 according to the invention comprises submitting the publication request directly from the gateway or application to the system server interface 65 in system form to invoke the various commands or functions to be performed by the publication means associated with the system server 16.

The system server 16 includes the repository means 15 and organizing means 14 and their various components for performing the various functions of the system. The system server 16 also maintains the database 68 which forms a component of the organizing means 14 and which includes data tables containing linking information, first network addressable location information, permission information, and subscription information. A document management system interface 73 and document management system 74 are components of the repository means 15 and are utilized by the system server 16 for storing and retrieving documents published through the system. An output interface 76 to an output system 77 is provided for directing documents to resources such as printers and resources for performing reactions such as sending e-mail messages and pager messages. These output components preferably comprise the delivery system disclosed in U.S. patent application Ser. No. 08/330,390. Also, the system includes an interserver communications process 79 for communicating with remote servers using Internet communications.

Figure 4:
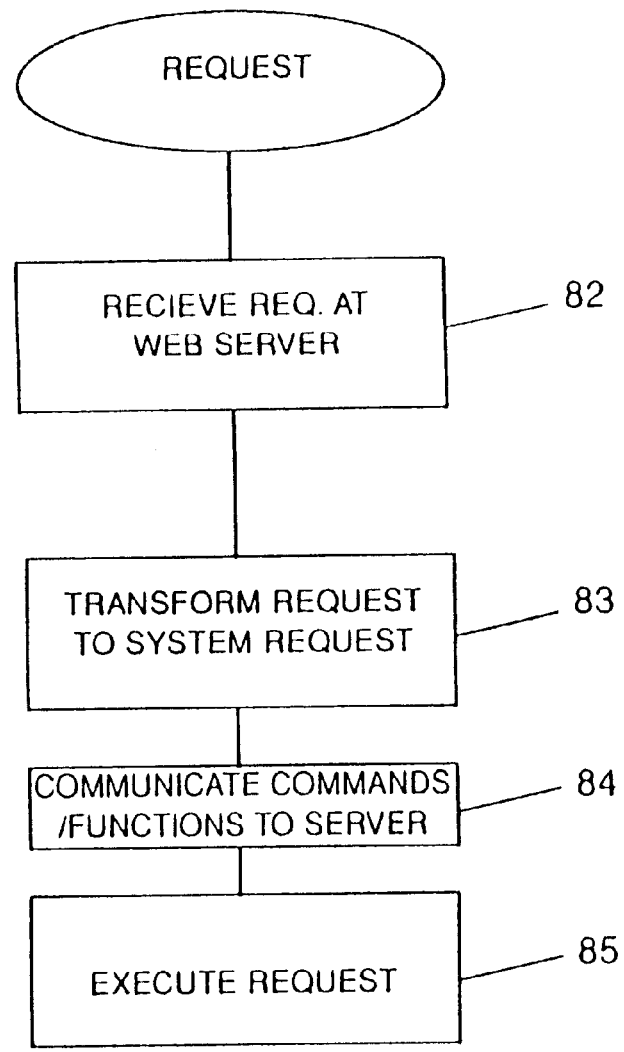
FIG. 4 is a flow chart showing the manner in which requests submitted by Internet users are processed according to the invention.

FIG. 4 illustrates the process utilized by the invention for handling requests submitted via an Internet communication. The process applies for all Internet submitted requests whether the request originates through an Internet browser 33, some other type of application 60 adapted to submit requests via the Internet, or a remote system server 61, all shown in FIG. 3. The submitted request is first communicated to the system via the Internet communication and then at step 82 received at the web server 32 associated with the local or host system server 16 shown in FIG. 3. The web server 32 transfers the network protocol request to the web server interface 64 which, at step 83, transforms the network protocol request to a system request, that is, to a format acceptable to the system server interface 65. The web server interface 64 then directs the system request to the system server interface 65 which at step 84 communicates the commands and functions required by the request along with any required data to the system server 16 for execution at step 85.

Figure 5:
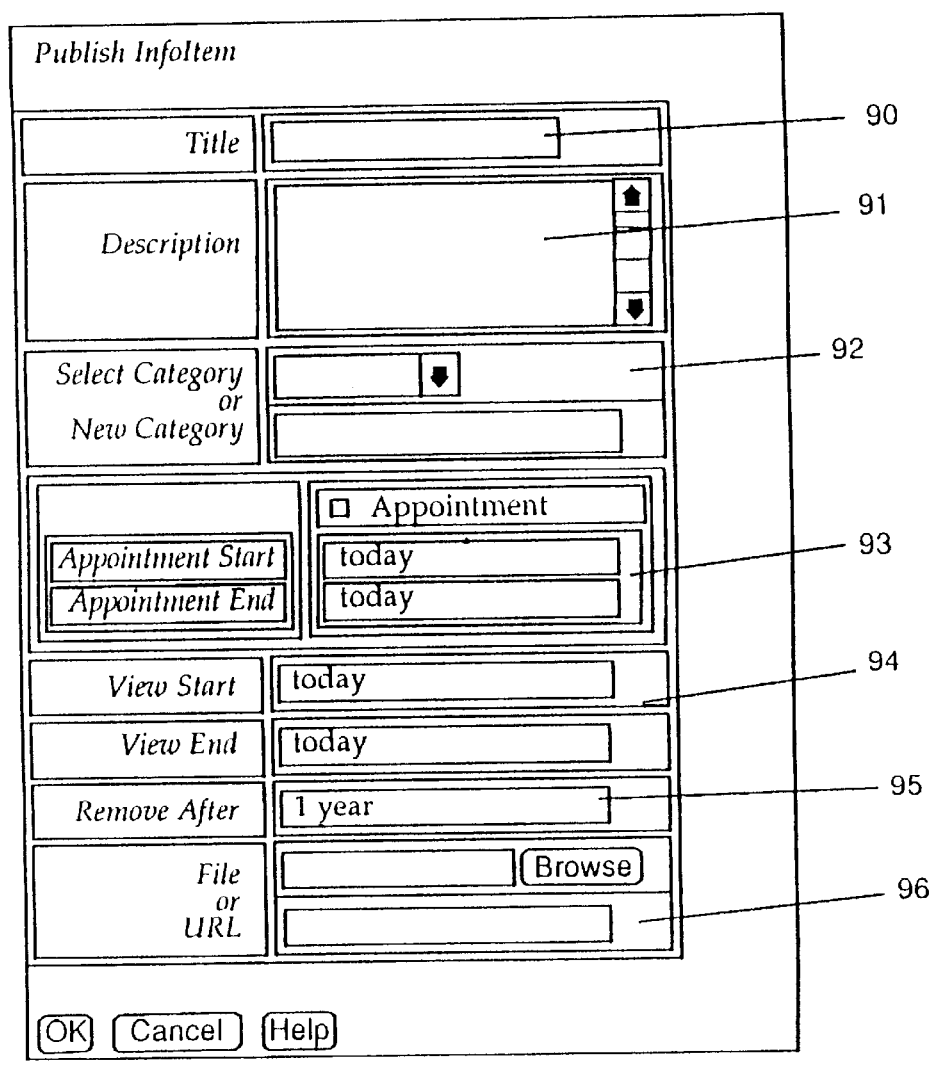
FIG. 5 is a diagrammatic representation of a display according to the invention through which an Internet user may publish an information element.
Figure 6:
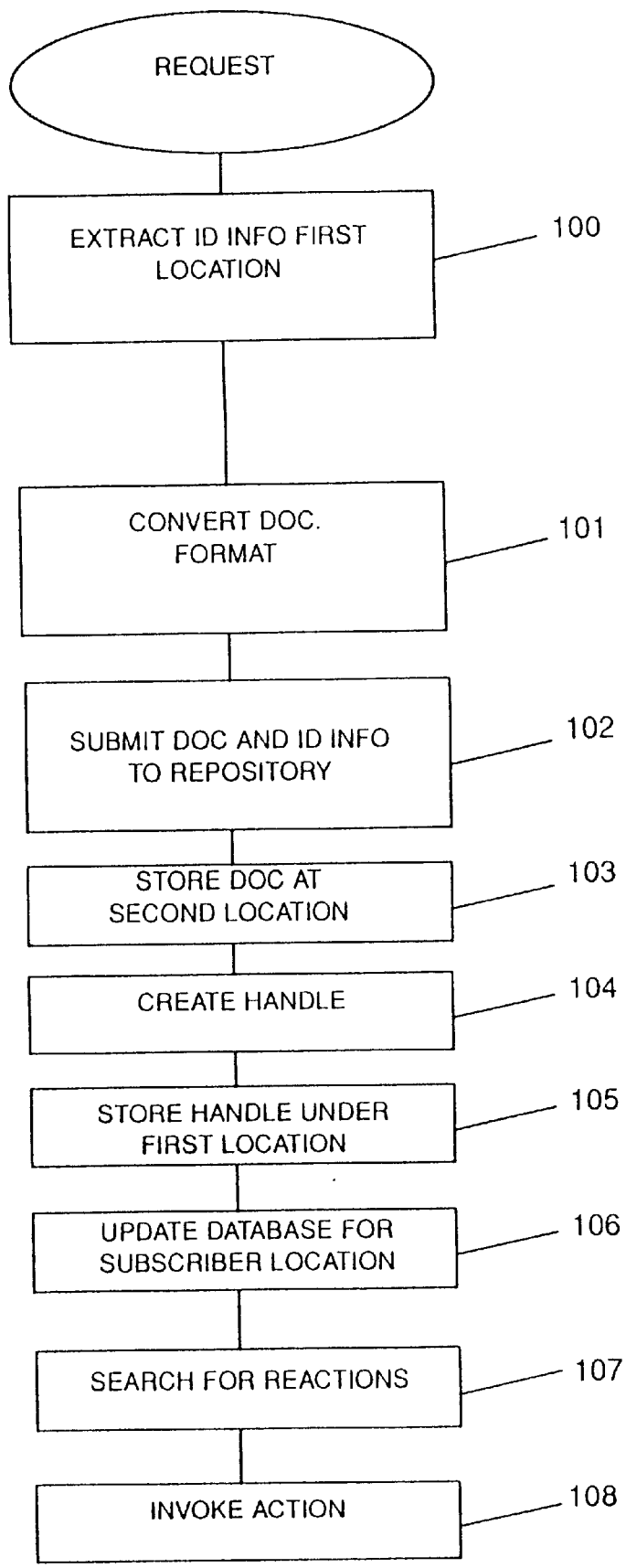
FIG. 6 is a flow chart showing the process steps performed for publishing an information element.

FIG. 5 may be used to describe how a publish request is formulated at a browser 33, while FIG. 6 illustrates the process steps required for publishing an information element 18 according to the invention. The dialogue or GUI shown in FIG. 5 appears over the primary display or page when the user chooses a publish tool on the primary display toolbar 40 (FIGS. 2A and 2B). This dialogue, along with all other dialogues chosen through the toolbar 40 are actually transferred to the remote computer 23 along with data required to produce the primary display and the information contained within the first network addressable location. The dialogue shown in FIG. 5 requests information required to publish an information element (18 in FIG. 1), including identifying information for the information element to be published, the location of the information element, and attributes of the publication. The identifying information preferably includes the title of the information element to be entered at box 90 and a description of the information element to be entered at box 91. The publication attributes include a subject division or category selected at boxes 92, start and end information to be entered at boxes 93 if the information element refers to an appointment, and finally display dates at boxes 94 and a removal date at box 95. The location of the document to be published is identified by a file name or a URL at box 96 in the dialogue.

When the user has entered the information requested in the dialogue shown in FIG. 5 and clicks the "OK" button, the primary display or interface illustrated at FIGS. 2A and 2B formulates or builds a publish request in the form of a specialized URL. This publish request is processed like any other Internet submitted request as shown in FIG. 4.

The operations or steps performed at step 85 in FIG. 4 for a publication request are set out in FIG. 6. At step 100, the publication means programmed in server 16 in FIG. 3 first extracts from the system request all of the information required to publish the particular document, including the identifying information, the information element to be published (or the URL to the information element), and publication attributes, including the first network addressable location under which the handle for the information element is to be stored. It will be noted that the dialogue shown in FIG. 5 does not request information on the first network addressable location where the handle is to be stored. Rather, the handle is stored under the first network addressable location associated with the primary display from which the publish dialogue was chosen.

After extracting all of the required information from the system request, the process preferably includes at step 101 converting any file representing the information element to a web viewable format, in the event that the document is not already in such a format. This conversion may be performed in any suitable manner. Once any document conversion is performed, the information element and the identifying information are submitted to the repository means (15 in FIG. 1) at step 102 and the repository means then at step 103 stores the information element at an available second network addressable location. The second network addressable location may be defined by the repository means 15. Once the second network addressable location is defined, the handle production means (24 in FIGS. 1 and 1A) then creates a repository handle (26 in FIG. 1A) for the information element.

Once the handle is created, the organizing means at step 105 stores the handle associated with the information element under the first network addressable location specified by the publisher. Subscription means at step 105 then updates a pending subscriptions data table in the database 68 to enable subscriber locations to recognize that the published information element has been published and a subscription data table must be updated. The subscription means comprises a program associated with the organizing means, for causing the system server 16 to perform the data table updates. When the subscriber loads their first network addressable location, a marker in the pending subscription data table causes the handle of the published element to be added at the subscriber location.

The final steps of the publication process involve reactions which will be discussed in detail below with reference to FIGS. 9A, 9B, and FIG. 10. At step 107, reaction means associated with the information organizing means (14 in FIGS. 1 and 1A) searches a reaction data table maintained in the system server database 68 to determine if the publication matches any triggering event type and satisfies an associated filter stored in the reaction table. If all of the reaction conditions are satisfied, the reaction means at step 108 produces a request to perform the predefined action. If the action must be performed by a resource external to the system 12, the system server 16 sends a command through the output interface 76 to the particular output resource 77 (FIG. 3) for performing the action.

Figure 7A:
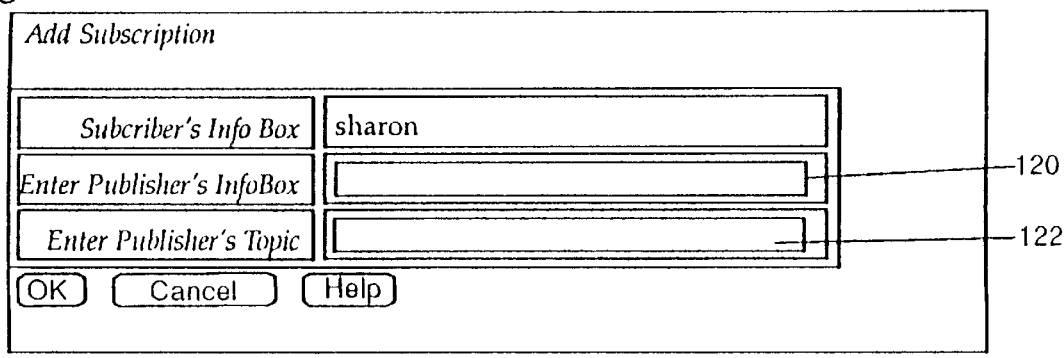
FIG. 7A is a diagrammatic representation of a display an Internet user may use according to the invention to subscribe to information elements published through a particular first network addressable location.
Figure 7B:
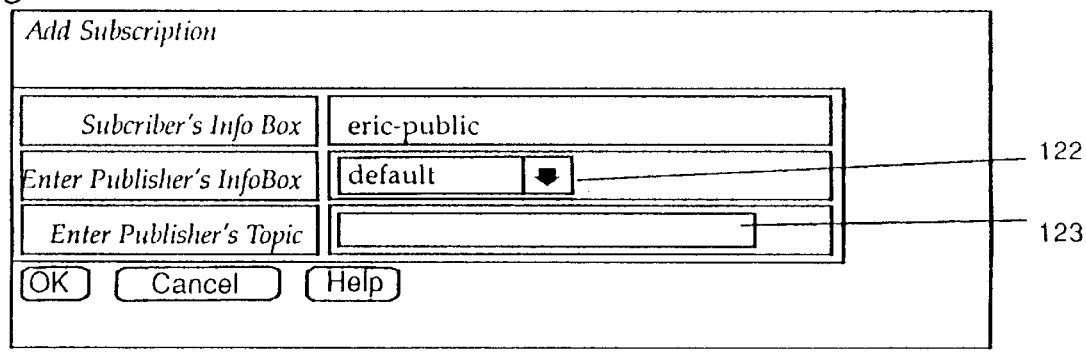
FIG. 7B is a diagrammatic representation of an alternative display through which an Internet user may subscribe to information elements published through a particular first network addressable location.
Figure 8:
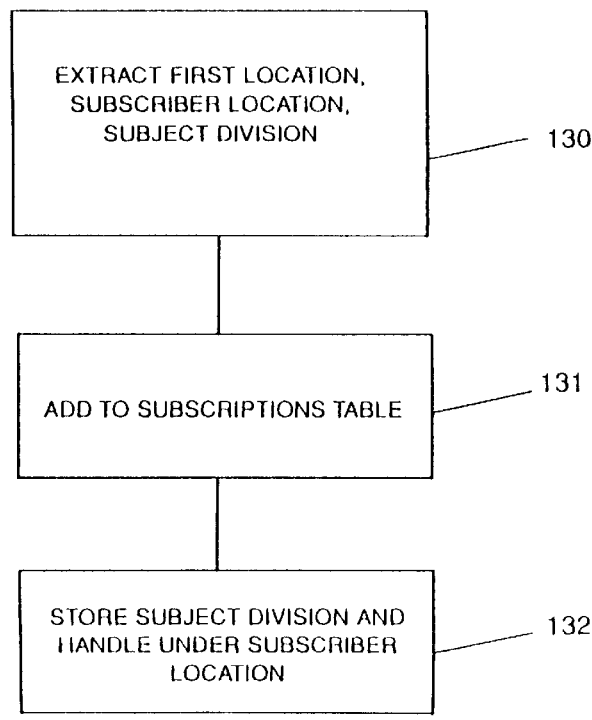
FIG. 8 is a flow chart illustrating the process steps performed in response to a subscription request.

The processes for submitting a subscription request through Internet communications may be described with particular reference to FIGS. 7A, 7B, and 8. FIGS. 7A and 7B show alternative displays or GUIs associated with the primary display shown in FIGS. 2A and 2B. The dialogue shown in FIG. 7A is invoked when a subscriber clicks a subscribe tool associated with a display showing their own first network addressable location. Since the subscriber's first network addressable location is known, the only information required for the subscription is an identification for the publisher's first network addressable location and the subject division (topic) under the publisher's location to which a subscription is requested. This information may be added at boxes 120 and 121. The dialogue shown in FIG. 7B is invoked from a system subscribe tool which may appear at the bottom of the index in the primary display for a publisher's first network addressable location. In this case, the identity of the publisher's location is known and all that is required is that the subscriber select the publisher's topic to which they desire a subscription at box 122 and then identify the subscriber's own first network addressable location at 123. Clicking the "OK" button from either dialogue 7A or 7B causes the primary display to formulate or build a subscribe request. This subscribe request is submitted according to the steps set out in FIG. 4.

Referring to FIG. 8, the subscription operation performed by subscription means programmed in the system server 16 includes at step 130 extracting the relevant data from the incoming request. For subscriptions, the data includes the first network addressable location being subscribed to, along with the subject division (in the illustrated case a topic division), and the subscriber first network addressable location where the information elements and topic being subscribed to are to appear. The subscription means then at step 131 adds the data to the subscription table maintained in the system server database 68. Finally, at step 132 in FIG. 8, the subscription means copies any handles already existing under the subscribed topic under the first network addressable location to which the subscription applies and stores those handles and subject division under the subscriber first network addressable location.

Figure 9A:
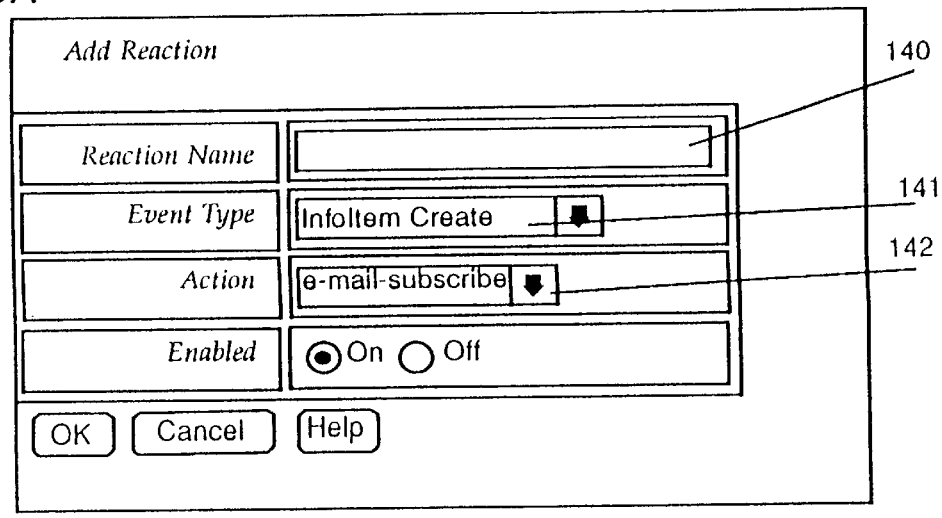
FIG. 9A is a diagrammatic representation of a display through which an Internet user may submit a reaction request according to the invention.
Figure 9B:
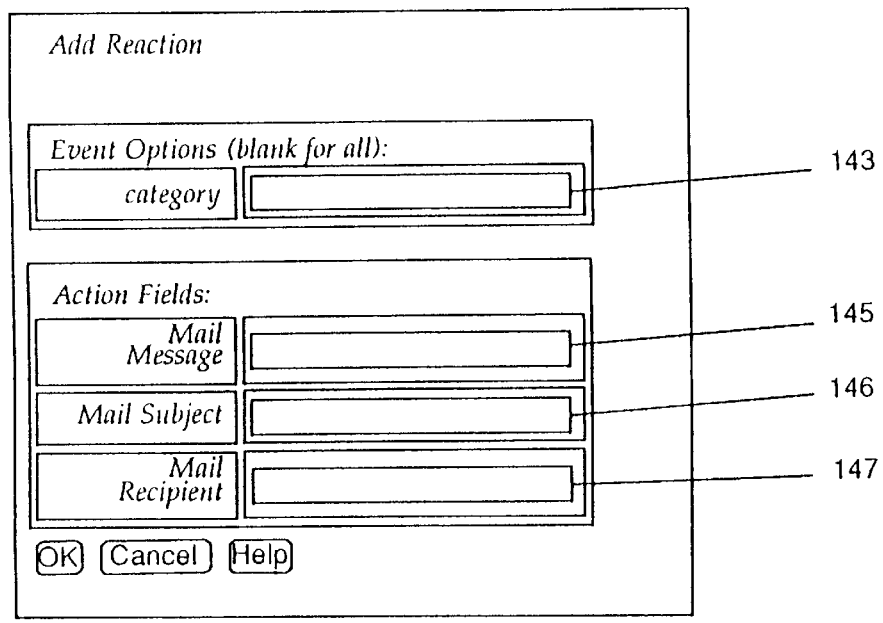
FIG. 9B is a diagrammatic representation of a display for defining reaction attributes.

FIGS. 9A and 9B illustrate primary display dialogues which may be used to set up a reaction according to the invention. Reaction means comprising programming operating on the system server (16 in FIG. 3) operates to detect a specified or predefined triggering event satisfying any predefined conditions and then requests or invokes some predefined action in response. The types of actions which may be predefined are limited by the output resources available to the system server 16, e-mail message, pager messages, faxes, or other actions may be available to be set up by a system administrator. The dialogue or GUI shown in FIG. 9A is invoked preferably through a "set-up reaction" item on a set-up menu available under a set-up tool on the primary display toolbar 40 (FIGS. 2A and 2B). The dialogue requests a reaction name or identifier at box 140 which may be used to identify the particular reaction, an event type or triggering event type at box 141, and an action type at box 142. Once this information is entered and the "next" button is activated, a dialogue such as that shown in FIG. 9B appears over the primary display. This dialogue allows a subject division or category to be specified at box 143 so that only events effecting that subject division will invoke the desired action. The information from the event options portion of the dialogue in FIG. 9B is used by the reaction means to set up a filter which must be satisfied before the predefined action is requested. The dialogue shown in FIG. 9B also requests information to define the particular action. This particular dialogue is specifically for an e-mail action and requests the mail message to be included in the e-mail, the subject, and the recipient for the e-mail at boxes 145, 146, and 147, respectively.

Once the information is added and the user clicks the "OK" button on the dialogue shown in FIG. 9B, the primary display creates a subscription request in the form of a specialized URL and then transmits that request URL to the system server 16 via Internet communications. This request is handled similarly to any Internet submitted request as shown in FIG. 4. On receipt of the subscription request at the system server 16, the system server extracts the information for the particular reaction and stores the information under the reactions data table in the system server database 68. The reaction means searches the reaction table as illustrated at step 107 in FIG. 6 each time a potential triggering event occurs. If the event type matches a triggering event type stored in the reaction table, and if any filter conditions specified in the table are satisfied, then the reaction means produces a request directing the specified output device to perform the predefined action as illustrated at step 108 in FIG. 6.

The preferred form of the invention also includes an arrangement or means for notifying a user of new handles which are stored under a first network addressable location which the user has accessed. This notification means is activated each time a user accesses or loads the contents of a first network addressable location. When the location is loaded to the user's computer, the notification means produces a notification request and communicates the request, preferably in the form of a URL, to the system server from which the location was loaded. This notification request causes the server 16 to produce a query to search for handles whose last update time is more recent than the last time that the particular user accessed the particular first network addressable location. The system server 16 will then return to the user location instructions to change the display (FIGS. 2A and 2B) in some desired fashion to indicate which handles contain new information. For example, the display may be changed to highlight the handles associated with new information or provide some image next to such handles.

In the preferred form of the invention, interactions between a user at a remote computer 23 and system server 16, as well as interactions between system servers are based upon an attribute-value paradigm. Under this paradigm, all data that is communicated from the remote user to the system server 16 and back again is done as a set of attributes that have one or more associated values for each. The system employs an attribute value pair or AVP library comprising predefined attribute names which may be associated with zero or more values. AVPs are formed into sets or lists which are passed between the communicating entities to communicate requests and data.

As shown in FIG. 1, many system servers 16 may be included in a system 12 embodying the principles of the invention. Users generally set up their first network addressable locations at a particular system server identified as their host or local system server. Each local system server is responsible for updating local first network addressable locations and keeping subscriptions relating to these first locations up-to-date. When a local user subscribes to a first network addressable location which is local to another system server or a remote system server, the subscription means associated with the local server causes the local server to contact the remote server to update the subscription when necessary.

In the preferred form of the system servers 16 cache information from remote system servers as necessary to speed system processes. For example, if a user has a first network addressable location at their local system server A, and enters a subscription for a first network addressable location local to remote system server B, the subscription means associated with system server A will contact system server B to update the subscription data tables maintained at system server B. System server A will also cache the information from system server B so that repeated access to the information will be performed quickly.

The system also preferably includes a web page based administrator's display or interface through which a particular first network addressable location may be defined. Using a set-up dialogue associated with the administrator's display, a user having special authorization to set-up first network addressable locations may enter the required information to define the attributes of the first location to be created. The attributes may include an identifier or name for the location, and permissions information such as whether the location is private and accessible only by the user, or public and accessible by anyone having access to the work. Once the required information is entered, the display formulates a location set-up request which is processed like any other system request as discussed above with reference to FIG. 4.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. An apparatus for publishing an information element through a first network addressable location of a communications network and improving access to such published information from a terminal having access to the network, the apparatus comprising:
   (a) repository means programmed in a computer for receiving the information element and storing the information element at a second network addressable location, the computer being connected to the communications network;
   (b) handle production means programmed in the computer for receiving identifying information relating to the information element and for producing a repository handle for the information element stored by the repository means, the repository handle including identifying information relating to the information element and a network address for the second network addressable location; and
   (c) information organizing means programmed in the computer for retrieving from the handle production means the repository handle associated with the information element within the second network addressable location and storing said repository handle under the first network addressable location.

2. The apparatus of claim 1 wherein the information organizing means includes:
   (a) subscription means programmed in the computer, the subscription means for receiving over the communications network a subscription request identifying characteristics of a future repository handle to be stored under the first network addressable location and, in response to the production of the future repository handle, copying the future repository handle and then storing said copied repository handle under a subscriber network addressable location.

3. The apparatus of claim 2 wherein the communication network comprises the Internet and wherein the and information organizing means has associated therewith:
   (a) an incoming web interface for receiving Internet communications from a remote computer.

4. The apparatus of claim 3 wherein:
   (a) the first network addressable location includes a first topic division within which the future repository handle is to be associated with a plurality of other repository handles which are each associated with a different information element; and
   (b) the subscription request identifies the characteristics of the future repository handle stored under the first network addressable location by identifying the first topic division.

5. The apparatus of claim 4 wherein the first network addressable location includes a plurality of other topic divisions in addition to the first topic division.

6. The apparatus of claim 4 wherein:
   (a) the first topic division includes a first category division within which the future repository handle is to be associated with a plurality of additional repository handles which are each associated with an additional information element; and
   (b) the subscription request identifies the characteristics of the future repository handle to be stored under the first network addressable location by identifying the first category division.

7. The apparatus of claim 6 wherein the first topic division includes a plurality of other category divisions in addition to the first category division.

8. The apparatus of claim 3 wherein the information organizing means further includes:
   (a) publication means programmed in the computer, the publication means for receiving from the remote computer via Internet communications a file containing the information element to be published and in addition to said file a publish request, and for extracting from the publish request the identifying information relating to the information element and a definition for the first network addressable location, and for passing said identifying information to the handle production means.

9. The apparatus of claim 8 wherein the publication means is also for extracting display information from the publish request, the display information associating the handle for the information element with a subject division under the first network addressable location.

10. The apparatus of claim 8 further comprising:
    (a) format conversion means associated with the publication means for identifying the format of the file containing the information element and converting the file to a web viewable format.

11. The apparatus of claim 3 further comprising:
    (a) publication means programmed in the computer, the publication means for receiving from the remote computer via Internet communications a URL associated with the information element to be published and a publish request, and for extracting from the publish request the identifying information relating to the information element and a definition for the first network addressable location, and for passing the identifying information to the handle production means.

12. The apparatus of claim 1 further comprising:
    (a) publication means programmed in a network computer in communication with the computer, the publication means (i) for receiving a publish request including a file containing the information element to be published, and for (ii) extracting from the publish request the identifying information relating to the information element, the file containing the information element to be published, and a definition for the first network addressable location, and for (iii) passing said identifying information to the handle production means.

13. The apparatus of claim 1 wherein the information organizing means further includes:

(a) reaction means programmed in the computer, the reaction means for producing an action request for a predefined action in response to the occurrence of an event affecting the first network addressable location.

14. The apparatus of claim 13 wherein the reaction means includes:

(a) reaction storage means for storing in a reaction data table a reaction identifier, a triggering event type, a filter, and an action definition defining the predefined action;

(b) search means for searching the reaction data table in response to a potential triggering event to determine if the potential triggering event matches and the triggering event type and satisfies the filter stored in the reaction data table; and (c) action request means for producing the action request if the potential triggering event matches the triggering event type and satisfies the filter.

15. The apparatus of claim 14 wherein the reaction means further includes:

(a) reaction definition means for receiving from a remote computer via Internet communication a reaction set-up request and for extracting from the reaction set-up request the reaction identifier, the triggering event type, the filter, and the action definition.

16. A method for publishing an information element so as to be accessible from a first Internet location, the method comprising the steps of:

(a) receiving a publish request for the information element, the publish request including the information element, identifying information relating to the information element, and a URL for the first Internet location;

(b) producing a repository handle for the information element, the repository handle including a URL for the second Internet location and the identifying information relating to the information element;

(c) storing the repository handle for the information element under the first Internet location; and (d) in response to the receipt of the publish request, storing the information element at a second Internet location.

17. A process for publishing information to a network addressable location of a communications network and improving access to such published information from a terminal having access to the network, the method comprising the steps of:

(a) associating an information element to be published with a first network addressable location;

(b) transferring the information element to a repository for storage therein, the repository comprising a computer storage device associated with a computer which is connected to the communications network;

(c) storing the information element at a second network addressable location at the repository;

(d) in response to the transfer of the information element to the repository, producing a repository handle for the information element, the repository handle including a network address for the second network addressable location at which the information element is stored, and also including identifying information relating to the information element; and (e) storing the repository handle under the first network addressable location.

18. The process of claim 17 wherein the communications network comprises the Internet communications network.

19. The process of claim 18 further comprising the steps of:

(a) receiving via Internet communications a subscription request identifying characteristics of a future repository handle to be stored under the first network addressable location; and (b) in response to the production of the future repository handle, copying the future repository handle and then storing said copied repository handle under a subscriber network addressable location.

20. The process of claim 19 further comprising the steps of:

(a) in response to the subscription request, storing the characteristics of the future repository handle and the subscriber network addressable location in a subscription data table; and (b) searching the subscription data table in response to the production of the repository handle to determine if the repository handle comprises the future repository handle.

21. The process of claim 20 wherein the characteristics of the future repository handle to be stored in the subscription data table comprise a subject division under the first network addressable location.

22. The process of claim 17 further comprising the steps of:

(a) receiving a publish request at a computer associated with the repository; and (b) extracting from the publish request the identifying information relating to the information element and a definition for the first network addressable location.

23. The process of claim 22:

(a) wherein the publish request is received via Internet communication.

24. The process of claim 22 further comprising the step of:

(a) extracting from the publish request display information associating the repository handle for the information element with a subject division under the first network addressable location.

25. The process of claim 17 further comprising the step of:

(a) identifying the format in which the information element is transferred to the repository and converting the format to a web viewable format.

26. The process of claim 18 further comprising the step of:

(a) producing an action request for a predefined action in response to the occurrence of an event effecting the first network addressable location.

27. The process of claim 26 further comprising the steps of:

(a) receiving from a remote computer via Internet communication, a reaction set-up request;

(b) extracting from the reaction set-up request a reaction identifier, a triggering event type, a filter, and an action definition;

(c) storing in a reaction data table the reaction identifier, the triggering event type, the filter, and the action definition;

(d) in response to the occurrence of a potential triggering event, searching the reaction data table to determine if the potential triggering event matches the triggering event type and satisfies the filter; and (e) producing the action request if the potential triggering event matches the triggering event type and satisfies the filter.

28. An apparatus for publishing information to an Internet location and improving access to such published information by an authorized Internet user:

(a) a repository computer system including a digital information storage device, the repository computer system adapted to receive identifying information relating to an information element and the information element which is to be accessible through a first Internet location and to store the information element at a second Internet location, the repository computer system including an Internet server process and operating to produce a repository handle when the information element is stored in the storage device, the repository handle including a URL for the second Internet location and identifying information relating to the information element; and (b) a handle organizing computer system including a digital information storage device and an Internet server process, the handle organizing computer system adapted to receive from the repository computer system the repository handle associated with the information element and to store the repository handle under the first Internet location.

29. A program product for operating on a computer having access to a communications network, the program product for publishing an information element through a first network addressable location of the communications network and improving access to such published information from a terminal having access to the network, the program product comprising:

(a) a computer-readable storage medium;

(b) repository means stored on the medium for enabling the computer to receive the information element and store the information element at a second network addressable location;

(c) handle production means stored on the medium for enabling the computer to receive identifying information relating to the information element and for producing a repository handle for the information element, the repository handle including identifying information relating to the information element and a network address for the second network addressable location; and (c) information organizing means stored on the medium for enabling the computer to obtain from the handle production means the repository handle associated with the information element stored at the second network addressable location and store said repository handle under the first network addressable location.

30. The program product of claim 29 wherein the information organizing means includes:

(a) subscription means stored on the medium, the subscription means for enabling the computer to receive over the communications network a subscription request identifying characteristics of a future repository handle to be stored under the first network addressable location and, in response to the production of the future repository handle, enabling the computer to copy the future repository handle and then store said copied repository handle under a subscriber network addressable location.

31. The program product of claim 30 wherein:

(a) the first network addressable location includes a first topic division within which the future repository handle is to be associated with a plurality of other repository handles which are each associated with a different information element; and (b) the subscription request identifies the characteristics of the future repository handle stored under the first network addressable location by identifying the first topic division.

32. The program product of claim 29 wherein the information organizing means further includes:

(a) publication means stored on the medium, the publication means for enabling the computer to receive from a remote computer via Internet communications a file containing the information element to be published and in addition to said file a publish request, and to extract from the publish request a definition for the first network addressable location and the identifying information relating to the information element, and to pass said identifying information for use by the handle production means.

33. The program product of claim 29 wherein the information organizing means further includes:

(a) reaction means stored on the medium, the reaction means for causing the computer to produce an action request, the action request directing the computer to invoke a predefined action in response to the occurrence of an event affecting the first network addressable location.

* * * * *